Jan. 12, 1932.  A. G. RAYBURN  1,840,875
POWER TRANSMISSION
Filed June 17, 1927   5 Sheets-Sheet 4

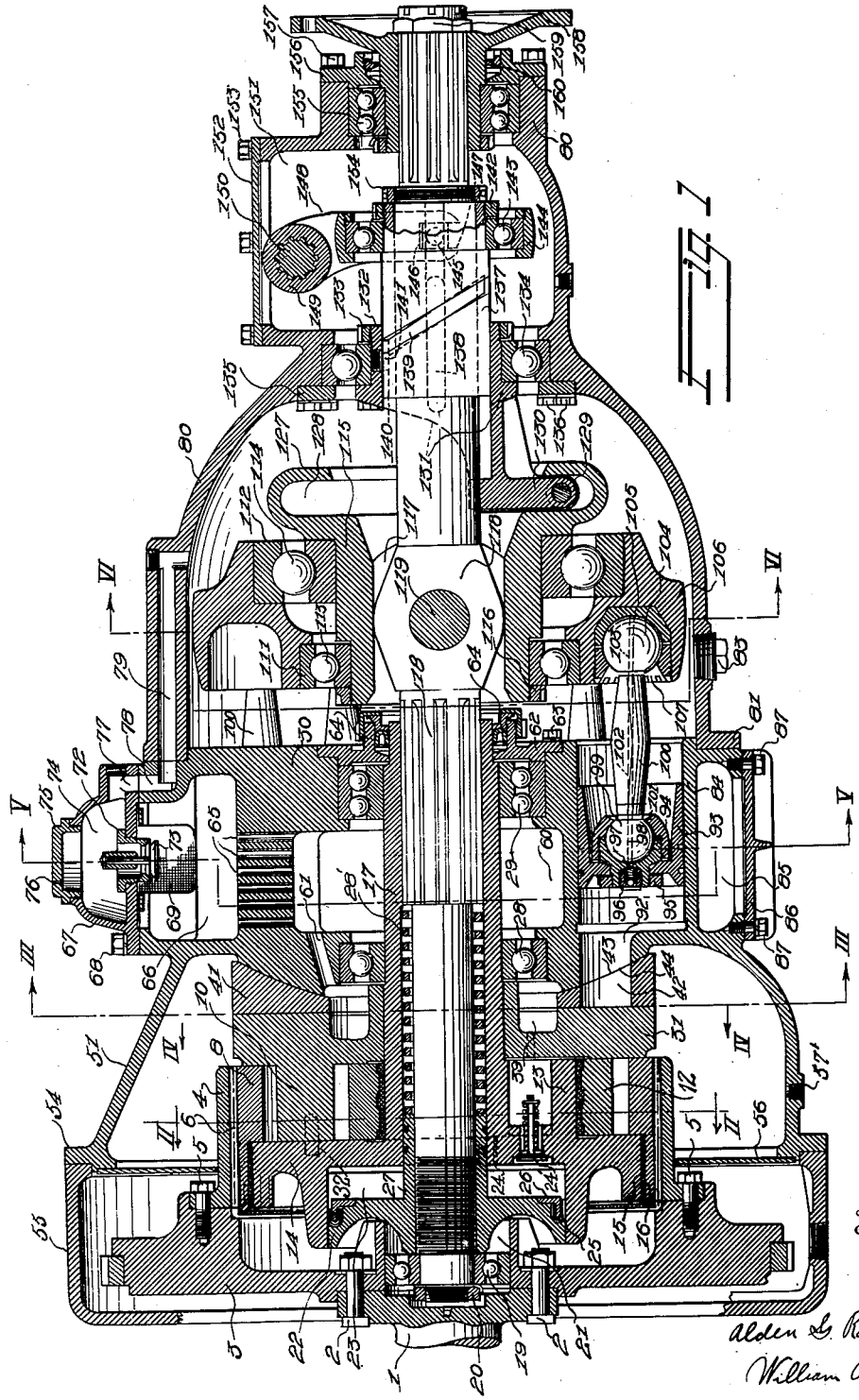

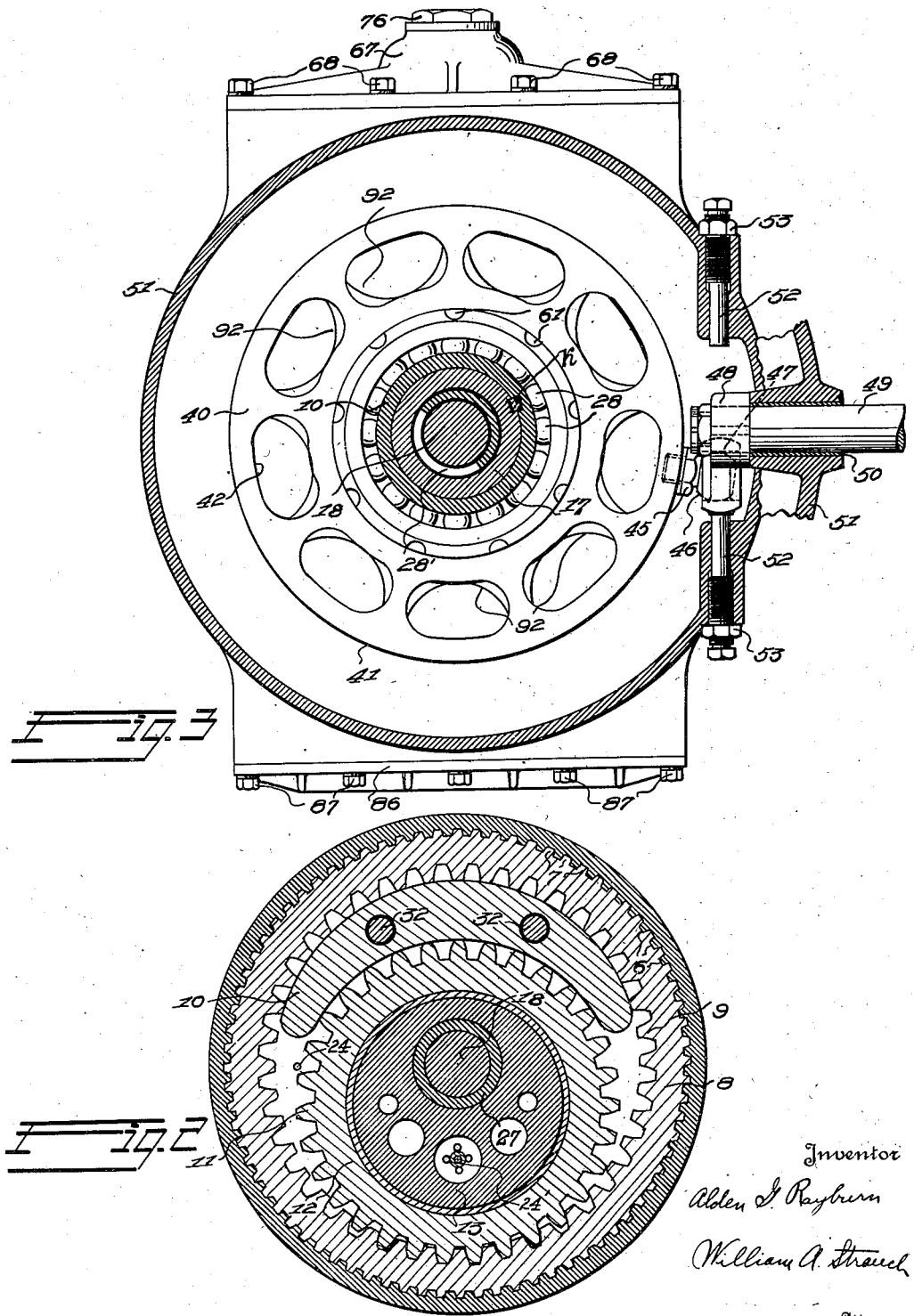

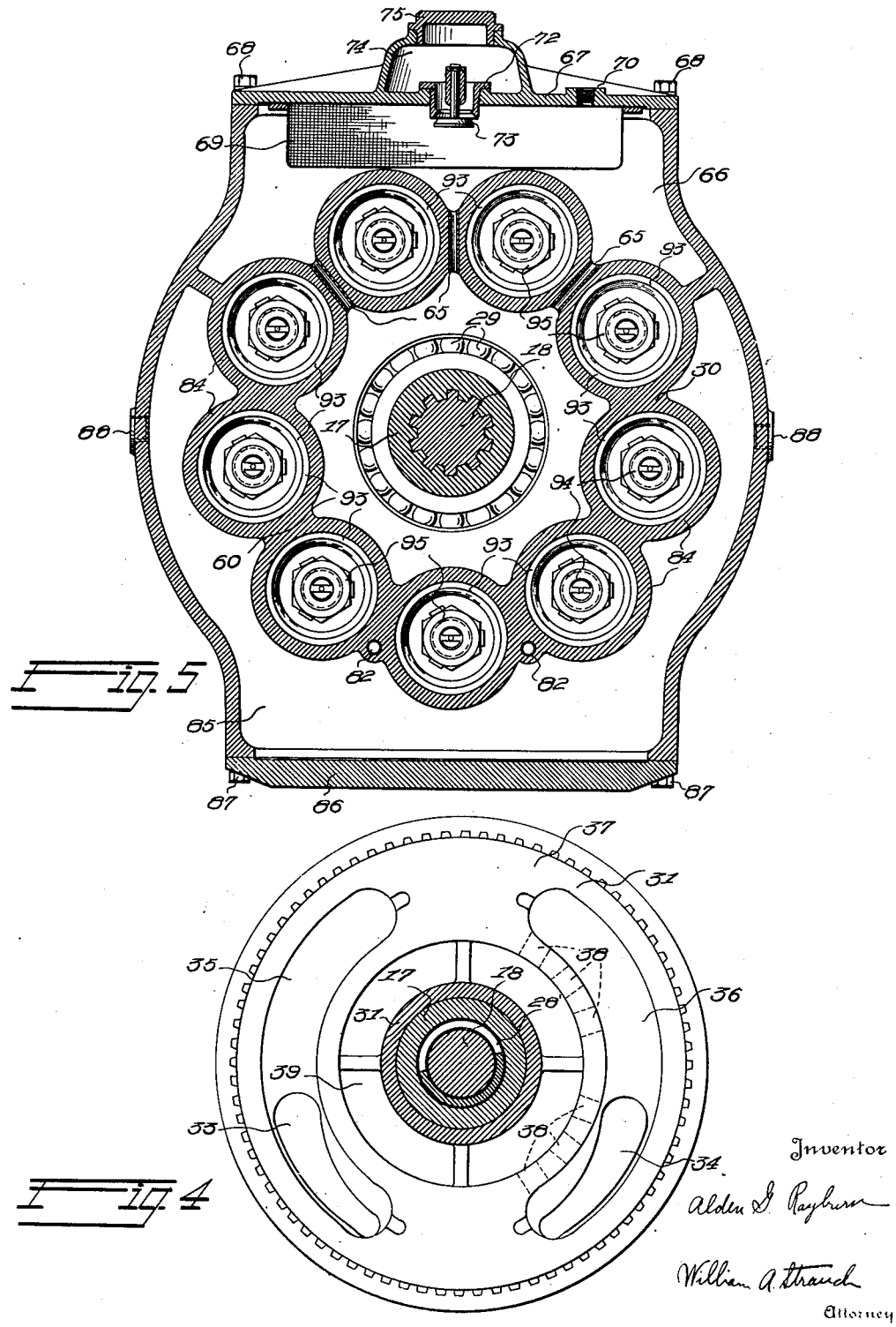

Inventor
Alden G. Rayburn
William A. Strauch
By
Attorney

Jan. 12, 1932.  A. G. RAYBURN  1,840,875
POWER TRANSMISSION
Filed June 17, 1927   5 Sheets-Sheet 5
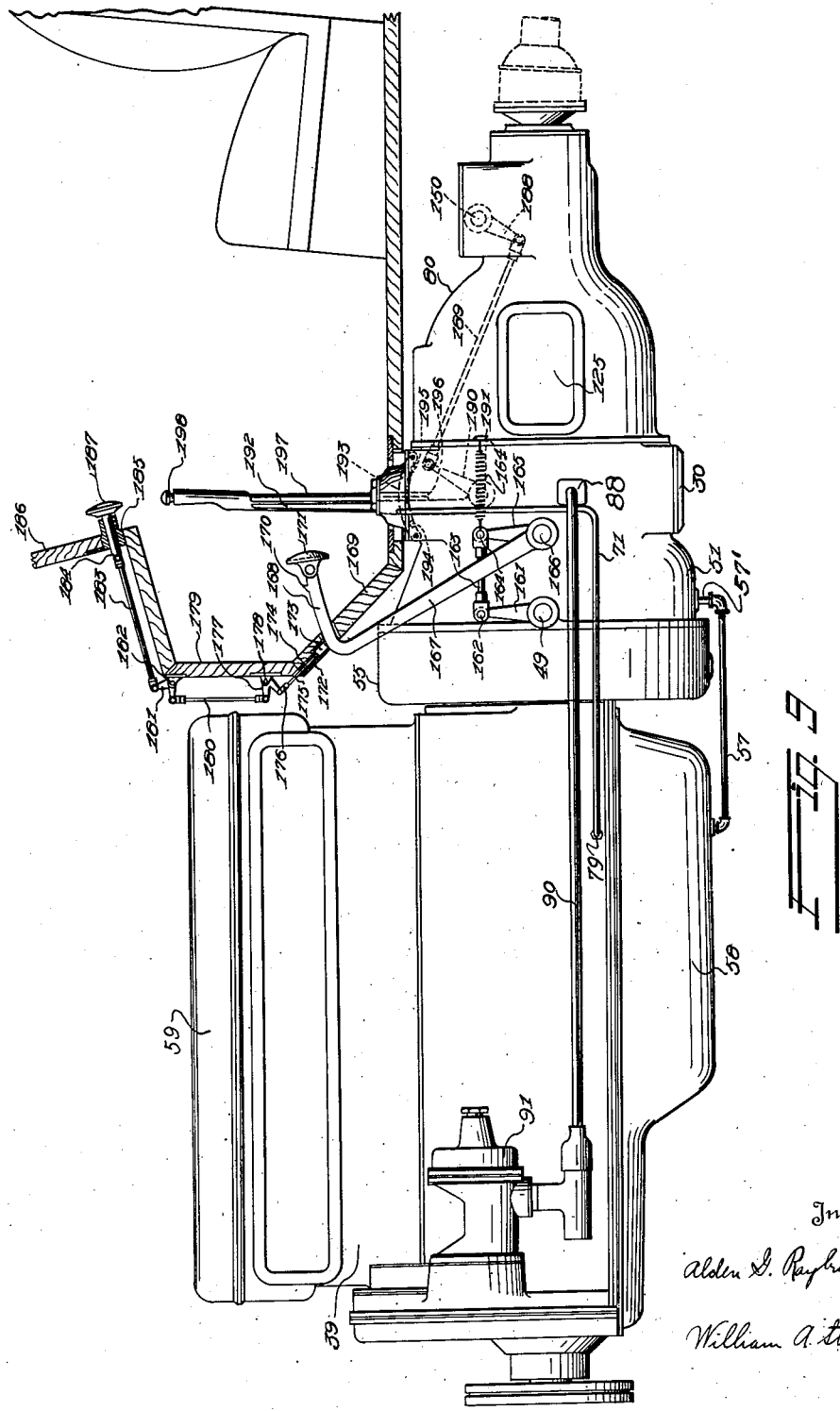
Inventor
Alden G. Rayburn
William A. Strauch
Attorney Patented Jan. 12, 1932

1,840,875

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

POWER TRANSMISSION

Application filed June 17, 1927. Serial No. 199,545.

The present invention relates to power transmissions and more particularly to torque multiplying and speed varying fluid operated power transmissions of the type in which the operating fluid comes to rest when the driving and driven members are rotated at the same speed.

An object of the invention is to provide hydraulic transmissions of the type mentioned in which the resistance to flow of fluid is reduced to a minimum and which are adaptable for the transmission of large powers and relatively high speed operation.

Another object of the invention is to provide improved hydraulic transmissions and novel controls therefor, and arrangements thereof in combination with internal combustion engines that are especially adaptable for utilization as torque multiplying power transmissions for motor vehicles.

Still another object of the invention is to provide novel power transmissions in which the torque multiplying ratio of the driving and driven members is automatically governed by the resistance to rotation of the tail shaft.

A further object of the invention is to provide a hydraulic transmission in which the parts automatically compensate for wear and are held in sealing relation by the pressures developed in the system during power transmitting operations and in which high pressure fluid packings are completely eliminated.

Still further objects of my invention are to provide simplified hydraulic transmissions in which the resistance to flow of the fluid is reduced to a minimum and which are adaptable for transmission of relatively higher powers and relatively high speed operation with higher efficiencies than have been heretofore attainable; to provide novel pump and motor constructions and principles of operation applicable for hydraulic transmissions of the differential and other types and adapted for use in various other relations; and to provide novel methods of controlling variable motors useful in the relations hereinafter set forth and independently thereof as will be obvious.

Further objects of the invention are such as may be attained by a utilization of the various combinations, subcombinations and principles hereinafter set forth in the various relations to which they may be adapted without departing from the spirit of my invention, as set forth more particularly in the following detailed disclosure of the preferred embodiments and in the terms of the appended claims.

As shown in the drawings—

Figure 1 is a sectional side elevation of a preferred embodiment of the invention.

Figure 2 is a transverse sectional view taken along line II—II of Figure 1, looking in the direction of the arrows.

Figure 3 is a transverse sectional view taken along line III—III of Figure 1, looking in the direction of the arrows.

Figure 4 is a transverse sectional view taken along line IV—IV of Figure 1, looking in the direction of the arrows.

Figure 5 is a transverse sectional view taken along line V—V of Figure 1, looking in the direction of the arrows.

Figure 9 is a more or less diagrammatic view showing the preferred arrangement of the invention in combination with an internal combustion engine for use in an automobile.

Figure 6:
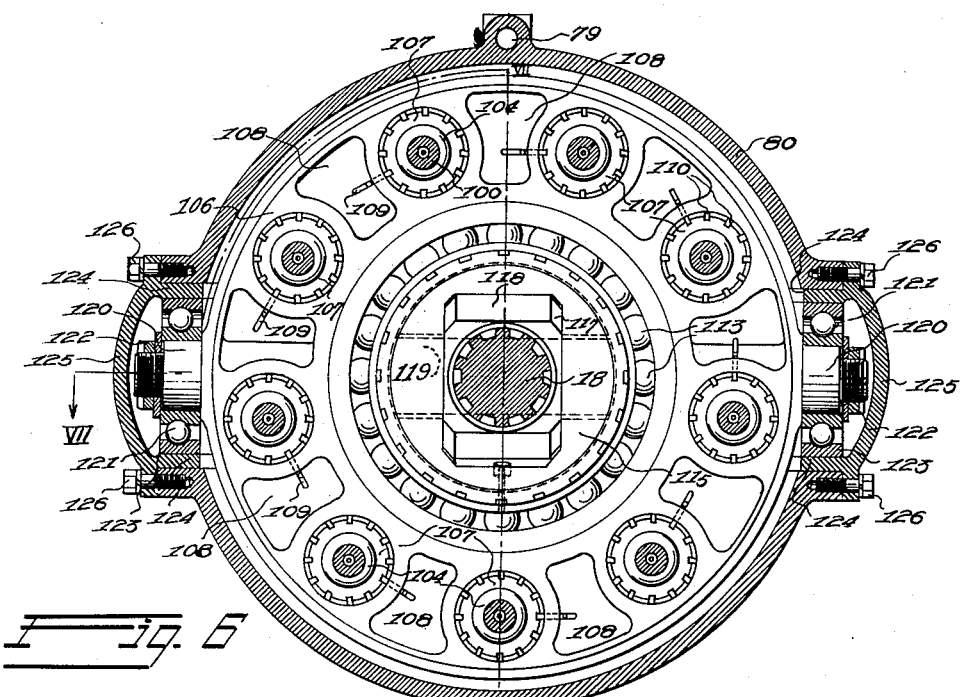
Figure 6 is a transverse sectional view taken along line VI—VI of Figure 1.

As shown in Figure 1, connected to a shaft 1 of a suitable prime mover, such for example, as a gasoline or internal combustion engine, by means of the securing bolts 2, is a flywheel 3 to which the end flange of a cylindrical drive member 4 is secured by means of the studs 5. Formed in the drive member 4 are internal series of driving teeth or splines 6 which mesh with the teeth or splines 7 (Figure 2) of pump ring gear 8. Gear 8 is provided with internal gear teeth 9, the inner surfaces of which are adapted to rotate in fluid sealing engagement with the outer surface of sealing segment 10 and which mesh with the teeth 11 of a pump pinion 12 opposite the center of segment 10. The tops or outer surfaces of pinion teeth 11 are adapted to rotate in fluid sealing engagement past the inner surface of sealing segment 10. Pinion 12 is journaled on eccentric 13 which is formed integrally with the pump side wall member 14. Formed on side wall member 14 is a suitable cylindrical pilot bearing section 15 on which the inner surface of cylindrical centering extension 16 of ring gear 8 is journaled for rotation. A central tubular driving quill section 17 is formed integrally with pump side wall member 14 the end of which is slidably splined to the driven or tail shaft section 18. Tail shaft 18 at its forward end is journaled in pilot bearing 19 of flywheel 3. The inner race of pilot bearing 19 is held on the end of and movable with shaft 18 by means of a securing nut 20 and the outer race thereof is slidably mounted in central bore 21 of flywheel 3. Threaded on the end of shaft 18 is a piston 22 slidably mounted for reciprocation in a cylinder 23 formed in pump side wall member 14. In operation of the mechanism, fluid under pressure is admitted to cylinder 23 continuously from the high pressure side of the pump through conduit 24 (Figures 1 and 2) and from the low pressure side of the pump through the poppet check valve 24' during deceleration and braking as will more fully hereinafter appear. During normal forward operation the spring of check valve 24' together with pressures developed in cylinder 23 hold the check valve closed. A packing leather 25 secured in piston 22 by means of securing ring 26 forms a fluid seal preventing loss of fluid around piston 22. The fluid pressure in cylinder 23 holds pump side wall member 14 in engagement with gear 8, sealing segment 10, and pinion 12 with a predetermined pressure in operation of the device as will more fully hereinafter appear. Piston 22 is provided with a tubular extension 27 which fits slidably into a bore formed in the quill 17. Surrounding shaft 18 and interposed between the end of tubular extension 27 and the ends of splines formed in the end of quill 17 is a helical compression spring 28', normally under compression to force the quill 17 together with the pump side wall 14 to the right in Figure 1 with relation to shaft 18. Quill 17 is supported for rotation in ball or anti-friction bearings 28 and 29 which are mounted in central bores formed in a stationary motor cylinder block and supporting casting 30.

Slidably keyed on quill 17, as at k, (Figure 3), is a pump end wall and fluid distributing plate 31 with which sealing segment 10 is integrally formed and against the inner surface of which gear 8 and pinion 12 abut. Secured in said wall member 14 and fitting into suitable guide holes formed in segment 10 are the supporting and aligning dowel pins 32. Formed in member 31 are ports 33 and 34 (Figure 4) which connect with distributing ports 35 and 36 respectively, formed in the timing face 37 of the plate 31. Fluid inlet ports 38 connect suction port 36 with central fluid storage space 39 formed in plate 31.

Face 37 of plate 31 is held in fluid sealing engagement with the valve face 40 (Figure 3) of clutch plate 41. Formed in clutch plate 41 are fluid ports 42 which are adapted to successively and alternately communicate with the distributing ports 35 and 36 of plate 31. Formed in the clutch plate 41 is a concave spherical seating and aligning surface 43 (Figure 1) which fits rotatably on a complemental convex spherical seating surface 44 of cylinder block 30.

Secured to the periphery of clutch plate 41 is an actuating extension 45 provided with a ball end 46 having spherical surfaced ends which fits into an elongated actuating slot 47 formed in the outer end of actuating lever arm 48. Slot 47 is shaped so that in operation of the device, a universal seating movement of clutch plate 41 on the seating surface 44 is permitted, and the angular position of clutch plate 41 is controlled by the position of lever 48. Lever 48 at its inner end is secured to and rotatable with actuating spindle 49 which is journaled for rotation in a bushing 50 supported in forward casing section 51 (Figures 1 and 3) formed integrally with the cylinder block or central casting 30. Threaded into suitable bosses formed in casing section 51 are the stop pins 52 (Figure 3) which are locked in position by means of lock nuts 53 and limit the motion of clutch plate 41 in operation of the mechanism. Formed on the casing section 51 is a securing flange 54 (Figure 1) which is secured by suitable studs or cap screws to the bell housing or casing section 55 of the prime mover. Secured to flange 54 is an annular dividing plate 56 through a central bore of which the coupling member 4 extends, thereby forming a partition between the interior of casing section 51 and the engine bell housing or casing 55 to prevent the passage of fluid from the transmission casing section 51 to the bell housing. Formed in bottom of casing section 51 is a threaded pipe connection 57' (Figures 1 and 9) through which the fluid accumulating in casing section 51 may pass into a suitable pipe 57 and be led to the crank case 58 of automobile engine 59 or to the suction side of a circulating pump (not shown) to be returned to the transmission after filtration and rectification as will more fully hereinafter appear.

Formed centrally in casting 30 is a fluid storage space 60 which is connected by conduits 61 (Figure 1) to a central fluid storage space formed in clutch plate 41 which communicates with the fluid feeding space 39 formed in valve plate 31. The rear end of the fluid storage space 60 is closed by a cap 62 which is secured to cylinder block 30 by means of studs or cap screws 63, and holds anti-friction bearing 29 supporting quill 17 and tail shaft 18 in position in the end of the cylinder block. A suitable low pressure packing gland structure 64 secured in cap 62 prevents loss of fluid from the central storage space 60 and substantially prevents air from being drawn from the rear casing into the fluid storage space 60, while the fluid in space 60 lubricates bearing 29. Formed in cylinder block 30 are a plurality of fluid ducts 65 (Figures 1 and 5) which establish communication between central storage space 60 and a fluid reservoir or storage chamber 66 formed in the top of casting 30. A cover plate 67 (Figures 1 and 5) secured in position by cap screws 68 closes the top of storage space 66. Secured to cover plate 67 is a filter screen 69 to which the fluid for the transmission is fed through a pipe connection 70 from the crank case 58 by way of a by-pass connection 71 (Figure 9) of the engine oil pump, or from any reservoir (not shown) other than the crank case and by way of an auxiliary circulating pump (not shown) other than the engine oil pump. Secured centrally in cover plate 67 (Figures 1 and 5) is a check valve seat 72 provided with a check valve 73 normally held in the open position by the action of gravity and operative to prevent excessive escape of fluid from chamber 66 into overflow chamber 74 formed in cap 67.

Instead of a check valve a labyrinth check arrangement may be provided to prevent loss of fluid due to sudden surges. The top of overflow chamber 74 is closed by a threaded filling plug 75 in which a small air outlet opening 76 is formed to permit the escape of air and gases to atmosphere. Fluid ducts 77 and 78, formed in cap 67 and casting 30 respectively, connect with a lubricating duct 79 formed in a rear transmission casing section 80 that is provided with a flange 81 secured by suitable cap screws to the casting 30.

Formed in the lower part of the cylinder block 30 are fluid passages or ducts 82 which connect the interior of casing sections 51 and 80 so that fluid accumulating upon rising above a predetermined level in the bottom of the casing section 80 will drain into the casing section 51. Located in the bottom of casing section 80 is a drain plug 83 through which any accumulated fluid in casing section 80 may be drained if desired.

Formed in cylinder block 30 (Figures 1 and 5) are parallel motor cylinders 84 preferably odd in number, equally spaced, and annularly arranged in the cylinder block. As shown the axis of the lowest cylinder and the central ducts 65 are located in the central vertical plane of shaft 18. Fluid storage chamber 66 is arranged around the periphery of the upper cylinders, and formed around the periphery of the remaining cylinders is the temperature control jacket space 85 having its sides formed integrally with casting 30, the bottom of which is provided with an opening covered by a removable cap 86 held in position by cap screws 87. Pipe connections 88 are provided through which a temperature controlling fluid such as water from the cooling system of the prime mover 59 may be circulated by means of piping 90 (Figure 9) to the engine water pump 91 and cooling radiator (not shown) to maintain the parts at a proper temperature.

Formed in cylinder block 30 are ports 92 (Figures 1 and 3) which terminate in the seating surface 44 of cylinder block 30 and are adapted to connect ports 42 of clutch plate 41 with the interior of the cylinders 84 respectively. Mounted for reciprocation in each cylinder 84 is a piston 93 (Figure 1) in which the cup-shaped ball seating members 94 are secured by means of lock nuts 95. Threaded into the inner end of each member 94 is a check valve 96 each provided with a ball valve held in position by the spring 97. Valves 96 permit fluid under pressure to feed outward from each piston through conduits 98 formed in the ball ends 99 of piston rods 100. Ball ends 99 are secured in position against the spherical seats formed in members 94 by means of securing caps 101 threaded on the ends of members 94, forming universal seats for the inner ball ends of the piston rods and having outer surfaces which fit non-rotatably within the skirts of the pistons 93 to lock the caps 101 against turning. Conduits 98 connect with fluid passages 102 formed in the piston rods 100 and passages 102 in turn communicate with lubricating ducts 103 formed in the outer ball ends 104 of the piston rods 100. Ball ends 104 of piston rods 100 are seated in sockets 105 secured in an oscillating ring 106 and are held in position by the cap members 107 threaded into suitable sockets formed in ring 106. Formed in oscillating member 106 (Figure 6) are cored openings 108 into which locking cotter pins 109 extend. Formed in caps 107 are locking notches 110 in which the inner ends of cotter pins 109 nest. In assembly of the mechanism, caps 107 are adjusted on balls 104 to permit a universal movement of the balls in their seats without lost motion and are then locked into position by means of the cotter pins 109. If lost motion develops due to wear in the operation of the mechanism, pins 109 may be removed and caps 107 readjusted to properly seat the ball members 104.

Mounted in bores formed in oscillating ring 106 are the outer races 111 and 112 respectively of the combined radial and thrust anti-friction bearings 113 and 114. The inner race of bearing 113 is adjustably held in position on a cylindrical extension of drive member 115 by means of the threaded adjusting collar 116 and the inner race of bearing 114 is rigidly secured to drive member 115. Formed through the center of drive member 115 is a flat sided drive slot 117 in which drive section 118 of tail shaft 18 slidably fits. Pivot pin 119 pivotally connects drive member 115 to the shaft section 118 as shown in Figures 1 and 6.

Figure 7:
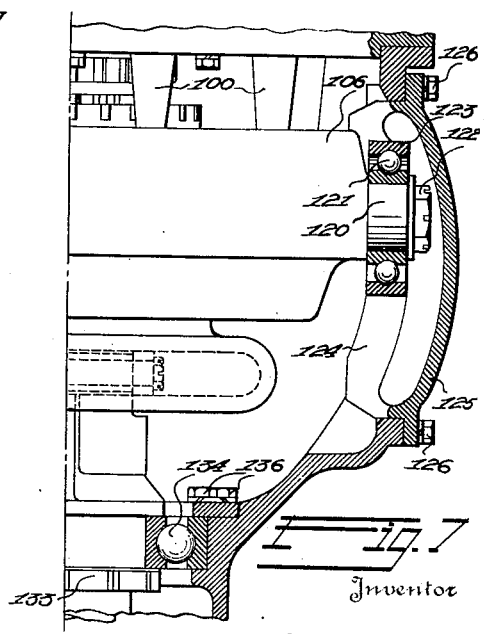
Figure 7 is a half sectional view taken along line VII—VII of Figure 6, looking in the direction of the arrow.

Formed integrally with oscillating ring 106 in axial alignment with pin 119 are the diametrically opposed supporting trunnions 120 (Figures 6 and 7) to which the anti-friction bearings 121 are secured by means of the lock nuts 122. Outer races 123 of bearing 121 are slidably and rotatably mounted between guide-ways 124 of caps 125 and resist rotation of ring 106. Caps 125 are secured in suitable seats formed in casing section 80 by means of cap screws 126. It will be seen that guides 124 permit oscillation of trunnions 120 about the axis of trunnion pin 119 without permitting rotation thereof in a plane normal to the axis of shaft 18.

Formed integrally with drive member 115 is an annular control section 127 in which the control channel 128 is formed. Positioned in the control channel 128 and adapted to swing through channel 128 with the parts in the position shown in Figure 1 is a reacting roller 129 which is rotatably mounted in extension 130 of control member 131. Secured on tubular section 132 of control member 131 by means of adjusting and securing nut 133 is the inner race of an anti-friction bearing 134, the outer race of which is mounted in a suitable bore formed in casing section 80 and is held in position by means of the securing ring 135 which is fastened to casing section 80 by means of securing cap screws 136. Fitting rotatably into a bore formed in the tubular section 132 of control member 131 is a control sleeve 137 which is slidably mounted on and keyed to tail shaft 18 by means of the securing key 138. Cut into the periphery of sleeve 137 is an angular actuating cam groove 139 which communicates with a longitudinal groove 140. Threaded into sleeve 132 is an actuating pin 141 the end of which normally projects into the groove 140 driving control member 131 with sleeve 137. Pin 141 is engaged by the angular sides of groove 139 when sleeve 137 is shifted longitudinally on tail shaft 18 to rotate control member 131 together with the reacting roller 129 through an angle of 180 degrees for the purpose of reversing the direction of rotation of the tail shaft as will more fully hereinafter appear.

Secured on the end of sleeve 137 by means of a securing and adjusting nut 142 is the inner race of an anti-friction bearing 143, the outer race of which is mounted in a shift collar 144. Formed on the shift collar 144 is a pair of diametrically opposite trunnions 145 on which the actuating blocks 146 are mounted. Actuating blocks 146 fit slidably into slots 147 formed in the lower ends of a pair of actuating arms 148 disposed on opposite sides of the collar 144. Arms 148 are formed integrally with sleeve 149 which is splined to an actuating shaft 150. Actuating shaft 150 is supported in suitable bearings formed in the side walls of a chamber 151 formed integrally with casing section 80. Chamber 151 is provided with a cover plate 152 secured in position by the cap screws 153. Threaded on tail shaft 18 is a shifting collar 154 against the forward face of which the rear end of sleeve 137 may be brought by actuating the shaft 150 in a manner that will more fully hereinafter appear.

The rear end of tail shaft 18 is supported in a suitable anti-friction bearing 155 which is held in position in casing section 80 by the end cover plate 156 secured in place by cap screws 157. Slidably splined to the end of tail shaft 18 is a coupling member 158 of a universal drive joint which is held in position on the end of the shaft by means of a lock nut 159. Surrounding a tubular extension of coupling member 158 is a packing gland structure 160 which prevents loss of fluid through the case.

To provide controls of the transmission mechanism so far described when used in automobiles and motor vehicles the arrangement shown in Figure 9 has been devised. This control mechanism comprises an operating arm 161 (Figure 9), the lower end of which is rigidly secured to the outer end of clutch operating shaft 49. The upper end of arm 161 is connected by a pin 162 to the forward end of operating link 163, the rear end of which is connected by pin 164 to an arm 165. A tension spring 164' holds arm 165 to the right. The lower end of arm 165 is journaled on a spindle 166 having an extension which is suitably supported in the transmission casing section 51. Journaled on the outer end of spindle 166 is an operating foot pedal 167 which is connected to and operates arm 165 through a suitable sleeve connection, and the upper section 168 of which extends through a suitable opening in the floor board 169 of the automobile. Formed on extension 168 is a locking projection 170, and secured to the end of extension 168 is a foot treadle member 171 by means of which the clutch pedal 167 may be depressed and rotated in a counter clockwise direction in Figure 9 to rotate clutch valve plate 41 to declutching or neutral position.

Secured to and set into the lower side of the floor board 169 is a locking cylinder member 172 in which locking plunger 173 is mounted for reciprocation. Locking plunger 173 is pressed downward by a coil spring 174 which is coiled around the operating extension 175 of plunger 173. The upper end of plunger 175 is connected by pivoted link 176 to the lower arm of a bell crank member 177 which is fulcrumed at 178 to the car body section 179. The upper arm of bell crank 177 is connected by a link 180 to the lower arm of an operating bell crank member 181 fulcrumed to the car body section 179 at 182. The upper arm of bell crank 181 is connected by link 183 to the forward end of an actuating rod 184. Actuating rod 184 is slidably mounted in a supporting casting 185 secured in the dash 186 of the vehicle. Formed on the outer end of rod 184 is an actuating button 187.

Rigidly secured to and actuating the outer end of control shaft 150 (Figure 9) is the upper end of an actuating arm 188, the lower end of which is connected by a link 189 to the upper end of an actuating arm 190. Arm 190 is rigidly secured to and rotatable with a spindle 191 supported in cylinder casting 30 and secured to the outer end of spindle 191 is the lower end of an actuating hand lever 192. Hand lever 192 is guided by a locking quadrant 193 secured to the transmission casing by suitable brackets. A single locking notch 194 is provided in the forward lower section of quadrant 193 while a series of notches 195 are provided in the rear lower section of the quadrant. A locking member 196 of any suitable construction is provided which is actuated by rod 197 through the control plunger 198 slidably mounted in the handle section of the actuating lever 192.

Figure 8:
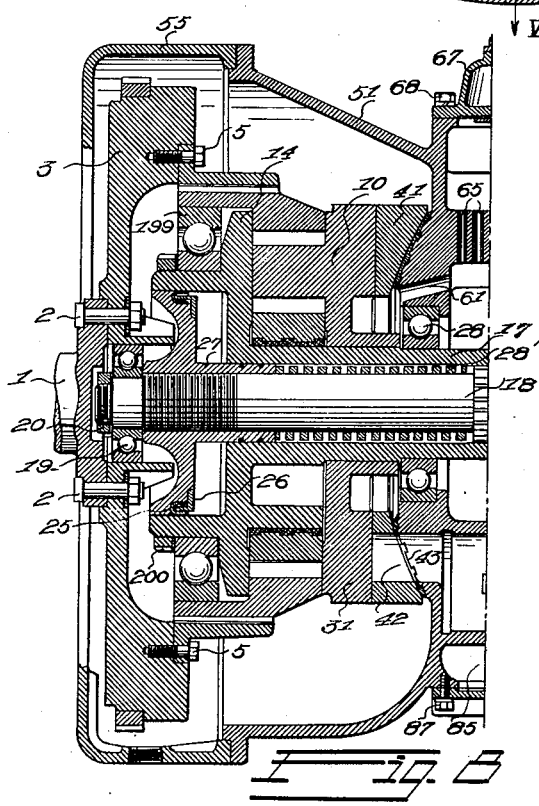
Figure 8 is a view of a modified form of the invention.

In Figure 8 a modified form of the invention is shown in which an anti-friction bearing 199 adjustably held in position by the threaded collar 200 on an extension of the pump side wall member 14 is substituted for the pilot bearing 15 shown in Figure 1. Otherwise the construction shown in Figure 8 is the same as that shown in Figure 1.

*Operation*

Having described preferred arrangements of my improved transmission the operation thereof will now be set forth. To vary the torque and speed relations of the driving member 4 and tail shaft 18, the angle of inclination of oscillating ring 106 with respect to the plane normal to the axis of rotation of tail shaft 18 is varied. In the mechanism shown the angularity of the oscillating ring 106 is controlled by shifting the tail shaft 18 endwise.

In the position of parts shown in Figure 9 with the hand lever 192 vertical the automatic control of the angularity of oscillating ring 106 is fully operative. To control the angularity of the oscillating ring 106 through the manual control disclosed in Figure 9, the plunger 198 is depressed freeing locking plunger 196 from the notches of quadrant 193, and lever 192 may then be shifted either clockwise or counterclockwise in Figure 9 from the position shown.

To predetermine the minimum angularity of oscillating ring 106 in a forward power transmitting direction for braking and deceleration purposes and to predetermine the minimum torque multiplying relation between the driving member 4 and driven shaft 18, shaft 18 is shifted to the right in Figure 1 by actuating shaft 150 to shift the actuating ring 144, bearing 143 and sleeve 137 to the right in Figure 1 to predetermine the extreme left position of pin 119. The position of the sleeve 137 to the right of the position shown in Figure 1 is controlled by shifting hand lever 192 to the right in Figure 9 the desired amount and releasing locking member 196 to engage one of the quadrant notches 195. This causes rotation of the shaft 150 in a counter clockwise direction in Figure 1 through the actuating arms 190 and 188 and actuating link 189. The position of sleeve 137 will be determined by the extent of inclination of the lever 192 with relation to its vertical position and the end of the sleeve will act as a stop for collar 154 of the tail shaft. Spring 28' and piston 22 can accordingly not return tail shaft 18 to the left beyond the point permitted by the setting of sleeve 137 so that the minimum angularity of the oscillating ring 106 will accordingly be determined by the movement of the sleeve 137 to the right in Figure 1 under the control of hand lever 192, but the automatic control of the mechanism from the point of minimum angularity fixed by the position of sleeve 137 to the maximum angularity of the oscillating ring will function as will be more fully hereinafter set forth so that if the resistance at the tail shaft demands a greater torque multiplication than is manually predetermined by the setting of sleeve 137 the automatic control will function to increase the torque multiplication.

To fill the transmission initially with fluid, oscillating ring 106 and related parts may be shifted through the manual control to a position inclined with relation to the vertical position shown in Figure 1, filling plug 75 may be removed, and fluid fed into the fluid storage space 66. The fluid passes downward through ducts 65 into the central fluid storage space 60 lubricating bearings 28 and 29, and passes through ducts 61 into space 39 and ports 38 of valve plate 31 into the suction port 36 of valve plate 31 and low pressure port 34 of the pump. After as much fluid has been filled into the circulating system as is possible in this way the prime mover is started into operation driving pump ring gear 8 which drives pinion 12 on eccentric 13 drawing fluid from port 36 through port 34, carrying it past sealing segment 10 and forcing it under pressure outward through port 33 into the high pressure port 35 of valve plate 31 and through passage 24 into cylinder 23 forcing piston 22 to the left in Figure 1 and holding check valve 24' closed. With the clutch plate 41 positioned so that the ports 42 thereof are in alignment with ports 92 of the motor cylinders 84, the fluid in port 35 will pass through the ports 42 in communication therewith into the motor cylinders 84 positioned on the proper side of the oscillating ring 106 across trunnion 119 so that the pistons 93 under pressure exert longitudinal thrusts on the piston rods 100 and oscillating ring 106 which are transmitted through the bearings 113 and 114 to the drive member 115 causing a resultant force tending to rotate drive member 115. Drive member 115 will accordingly rotate tail shaft 18 in the direction of rotation of the driving coupling 4 and exerts a longitudinal thrust on shaft 18 which is transmitted through piston 22 and the oil in cylinder 23 to the pump side wall 14 holding the pump and valve faces in fluid sealing engagement with a predetermined pressure in excess of the total fluid pressures tending to separate the valve faces, while permitting expansion and contraction of the parts and the endwise movement of shaft 18 in operation. The oil in chamber 23 has a further tendency toward sealing the pump and valve faces in that, as it is thrown radially outwardly by centrifugal force, it reacts laterally against pump wall 14 and piston 22 to force them apart.

In addition to the driving force applied to the tail shaft by the motor, the reaction due to pumping is transmitted through eccentric 13 and quill 17 to tail shaft 18. Shaft 18 will then rotate at a speed with relation to the speed of driving member 4 that will depend upon the volumetric capacity of the motor per revolution of shaft 17 in well known manner. As shaft 18 rotates, valve or timing member 31 will be driven thereby and the admission of fluid to the cylinders 84 will be so timed as to maintain reciprocation of the pistons 93, oscillation of ring 106, and rotation of shaft 18. The relation of parts is such that while pistons 93 are moving to the right in Figure 1, their respective cylinders will be in communication with the high pressure port 35, while when the pistons are moving to the left in Figure 1 their respective cylinders will be in communication with the suction port 36. On the inward stroke of the pistons, the fluid, together with any air that may be contained in the cylinders will be forced through port 36 and as the valve 31 rotates with the tail shaft, fluid will pass from chamber 39 under the influence of centrifugal force through ducts 38 into port 36 while air entrained in the circulating fluid will pass outward through ducts 38, and will pass through the openings 61 into the storage chamber 60 from which it will rise upward through the passages 65 and will pass out through the check valve 73 into space 74 and then to atmosphere. As the operation continues the air entrained in the fluid circulating system will be rapidly replaced by fluid and after the air has been eliminated the filling is continued until the fluid overflows through the check valve 73 into the lubricating conduits 77, 78 and 79. After the circulating system has been filled with fluid the plug 75 may be replaced and the operation of the prime mover and transmission may be continued to permit the engine oil pump to force oil from the crank case into the pipe 71 and thence into the chamber 66 by way of the connection 70. At this time the fluid is overflowing into the conduits 77, 78 and 79 dropping into the path of oscillating ring 106 from where part is thrown into bearing 134 and chamber 151, and the remainder is passing downward into bearings 113 and 114, over the oscillating ring and motor drive parts, lubricating the parts and collecting in casing section 80, then passing through ducts 82 in cylinder block 30 into casing section 51 and back through the connection 56 and pipe 57 into the engine crank case. Oil is continuously added to the engine crank case until the proper crank case oil level is maintained continuously, indicating that the fluid storage chambers of the transmission and all passages of the entire system have been filled with fluid.

As fluid pressure is applied to each piston 93 the ball in check valve 96 will unseat and a small quantity of fluid will pass outward under pressure through the lubricating duct 98 into the passages 102 and ducts 103 lubricating the ball seats and ball ends 99 and 104 of piston rods 100. During the inward or return stroke of the motor pistons the balls in the check valves 96 will seat under the influence of their springs 97 preventing the entry of any substantial amount of air through the lubricating passages or the ball ends of the piston rods.

It will accordingly be seen that when the mechanism is filled with fluid all of the operating parts are properly lubricated and any air entrained in the fluid during power transmitting operations will pass out of the circulating system through ducts 38 without causing formation of emulsion and the mechanism is operative for power transmitting purposes.

With the parts positioned as shown in the drawings, while the mechanism is transmitting power the oscillating ring 106 is in a plane normal to the axis of rotation of the tail shaft and the volumetric capacity of the motor is zero. With the motor at zero capacity no fluid can be circulated between the pump and the motor and the pump parts are hydraulically locked together. Under these conditions the pump serves as a hydraulic clutch locking the driving member 4 to the tail shaft 18 for rotation in the same direction and at the same speed, and the transmission is in direct couple.

The pressure developed in the fluid under such a condition depends upon the torque demand on the tail shaft, and the parts are preferably so proportioned and arranged that so long as the load on the tail shaft can be efficiently handled directly by the prime mover the parts will remain in direct couple. When the load on the tail shaft increases so that a greater torque demand is made thereon than can be delivered directly and with efficiency by the prime mover, the pressures developed in the pump unit increase the end thrust of the pistons 93 on the oscillating ring 106 and tail shaft 18 to the point where the resistance to motion of the tail shaft by spring 28′ and the fluid under pressure in cylinder 23 is overcome, and the tail shaft together with the trunnion pin 119 will move to the right in Figure 1 tilting the wobble disk 106 and increasing the volumetric capacity of the motor until a new balance condition has been reached. In the new position of parts the speed of the tail shaft will be reduced below the speed of the driving member 4 and the torque will be multiplied to handle the increased load. As the load on the tail shaft varies the fluid pressures developed by the pump will vary, varying the endwise position of the tail shaft, and accordingly the torque multiplying ratio of the mechanism to meet the varied torque demands. As the load on the tail shaft decreases spring 28′ will shift the tail shaft to the left in Figure 1 decreasing the volumetric capacity of the motor and the torque multiplying ratio of the mechanism, and when the load decreases to the point where it can be efficiently handled by the prime mover in direct couple, the oscillating ring will be brought to a position normal to the axis of rotation of the tail shaft 18 and pumping of fluid will again cease. In this way it will be seen that a transmission mechanism is provided in which the torque multiplying ratio may automatically be varied as the load on the tail shaft increases above a point which may be predetermined by the proportions of parts selected and by the positioning of sleeve 137 under manual control.

When lever 192 is thrown forward or counter-clockwise in Figure 9 until locking member 196 drops into notch 194, shaft 150 will be rotated in a clockwise direction in Figure 1 through the actuation of arm 190, link 189, and arm 188. This movement of shaft 150 causes the shift member 148 and the parts carried thereby to shift sleeve 137, to the left in Figure 1 on its key 138. As sleeve 137 shifts to the left cam groove 139 reacts on pin 141 rotating control member 131 with reacting roller 129 through an angle of 180 degrees. As the fluid pressures in the system build up to overcome the resistance at the tail shaft to rotation due to the pumping action, the end thrust exerted by pistons 93 through drive member 70 oscillating ring 106 through drive member 115 and pin 119 on tail shaft 18, will cause the tail shaft 18 to move endwise against the tension of the spring 28′. The reacting roller 129 being positioned diametrically opposite to the position shown in Figure 1 will cause oscillating ring 106 to tilt in an opposite direction and the endwise movement of shaft 18 will continue until the motor develops sufficient torque to overcome the resistance to motion of the tail shaft and to rotate the tail shaft in a direction opposite to the rotation of the driving member 4.

To establish a neutral condition in the mechanism so that the driving connection 4 and pump gears may be driven without driving the tail shaft, shaft 49 is actuated through the pedal 167 or other means if used, to rotate clutch plate 41 on its seating surface 44 until ports 42 of clutch plate 41 interconnect motor cylinder ports 92. In this position of parts, a circulating path for the fluid will be established between the ports 35 and 36 of the valve 31, independently of the motor cylinders, preventing the building up of sufficient pressures by the action of the pump to produce rotation of the tail shaft 18 against a substantial resistance.

In a motor vehicle, the driving wheels frequently drive the tail shaft, as for example, during de-celeration periods. Under these conditions the driven shaft will tend to speed ahead of the engine rotating eccentric 13 and segment 10 which actuates pinion 12 and the pump parts reversing the pumping action and drawing fluid from the high pressure port 35, forcing it into the low pressure port 36, and out through the ports 38 into the tank space 39. This causes a surge of fluid through ducts 61 into the fluid storage space 60 and ducts 65 into the space 66 which closes the check valve 73 and the fluid is then confined under pressure in the fluid storage spaces. This action removes the resistance to rotation of the driving shaft momentarily and the engine will speed up following the tail shaft 18. In this way a flexible driving connection is maintained between the driving member and the driven shaft which will absorb shocks due to sudden deceleration and will cushion the drive improving the riding qualities and operation of the vehicle as a whole.

When it is desired to utilize the mechanism for rapid deceleration for braking purposes, sleeve 137 is set manually, ring 106 at a minimum angle which will give the desired torque ratio and braking effect. With the parts in this position, as the wheels drive the tail shaft, the motor unit will function as a pump, fluid pressures will be built up on the suction side of the system, and in the fluid storage space closing check valve 73 and fluid will be forced under pressure into the pump unit unseating check valve 24' and causing the pump to function as a motor tending to speed the engine ahead of the tail shaft at a rate depending upon the inclination of ring 106. The fluid entering cylinder 23 through check valve 24' will force piston 22 to the left in Figure 1 holding tail shaft 18 in fixed position with stop collar 154 against the end of sleeve 137 and will hold the pump parts in assembled relation against the fluid pressures tending to separate them. In this way it will be seen that the compression of the engine may be utilized for braking purposes.

It will be understood by those skilled in the art that preferred embodiments only of the invention are disclosed and that wide variations therein may be made without departing from the spirit of my invention, as defined by the scope of the appended claims. Accordingly, what is desired to be secured by Letters Patent and claimed as new is:

1. A fluid operated transmission comprising driving and driven members said driven member comprising a shaft; a fluid pump actuated by the difference in rotation of said driving and driven members; a motor driving said driven member and actuated by fluid delivered thereto by said pump; and means, including said driven member, actuated by the driving reactions of said motor for automatically varying the volumetric capacity thereof.

2. A hydraulic transmission comprising driving and driven members; a pump operated to pump fluid by the difference in rotation of said driving and driven members; a variable capacity fluid motor driving said driven member; fluid distributing means driven by said driven member interposed between said motor and said pump; and means, including a longitudinally shiftable motor element, actuated by the driving thrust reactions of said motor for automatically varying the volumetric capacity thereof in response to pressures developed by said pump.

3. A hydraulic transmission comprising driving and driven members; a pump operated to pump fluid by the difference in rotation of said driving and said driven members; fluid timing means for said pump actuated by said driven member; a plurality of relatively stationary motor cylinders receiving fluid from said pumping means; a plurality of fluid actuated pistons mounted for reciprocation in said motor cylinders; driving connections between said driven member and said pistons; and means, including a pivoted and longitudinally shiftable swash plate, for varying the stroke of said pistons controlled by the end thrust developed by said pistons.

4. In a hydraulic transmission, a driving member; a driven member; a variable capacity hydraulic motor driving said driven member; and a hydraulic pump comprising relatively separable parts actuated by the difference in rotation of said driving and said driven members adapted to deliver fluid under pressure to said hydraulic motor; and means actuated by the fluid pressures developed in said pump to hold the parts of said pump in operative relation against the fluid pressures developed therein and to automatically vary the volumetric capacity of said motor.

5. In a hydraulic transmission, a driving member; a driven member; a pump comprising a gear actuated by said driving member and a gear actuated by said driven member; a motor driving said driven member actuated by fluid delivered thereto by said pump; and means operated by the fluid pressures developed in said pump for holding the parts of said pump in operative relation and to automatically control the fluid pressures developed by said pump.

6. In a hydraulic transmission, a driving member; a driven member; a fluid motor actuating said driven member; a pump embodying separable parts adapted to deliver fluid under pressure to said motor actuated by said driving and said driven members; and means for holding said pump parts in operative relation by driving reactions of said motor and to automatically control the fluid pressures developed by said pump.

7. A hydraulic transmission comprising a driving member; a driven member; supporting means for said members; a pump actuated by said driving and said driven members; a fluid motor actuating said driven member operated by fluid delivered thereto by said pump, means associated with said pump and said driven member to balance the reactions of said pump in operation so that only torsional reactions are transmitted thereby to said supporting means during power transmitting operations; and means for reversing the direction of rotation of said motor.

8. A hydraulic transmission comprising a driving member; a driven member; a pump driven by said driving and said driven members; a motor actuated by fluid delivered thereto by said pump driving said driven member; manually operable means; and means for automatically controlling the volumetric capacity of said motor in response to fluid pressures developed by said pump and for reversing the direction of rotation thereof in response to manipulation of said manually operable means.

9. In a hydraulic transmission, a driving member; a driven member; a pump actuated by the difference in rotation of said driving and said driven members; a variable capacity motor driving said driven member; automatic means, including said driven member, for varying the capacity of said motor in response to fluid pressures developed by said pump; and manual means for controlling the capacity of said motor.

10. A hydraulic transmission comprising a driving member; a longitudinally adjustable driven member; a fluid pump actuated by the difference in rotation of said driving and said driven members; a motor driving said driven member; fluid distributing means interposed between said motor and said pump; automatic means for varying the volumetric capacity of said motor in response to fluid pressures developed by said pump; and means to cause shifting of said driven member to vary the operation of said automatic means.

11. In combination, a variable capacity fluid motor; means for supplying operating fluid under fluctuating pressures to said motor; means for automatically varying the volumetric capacity of said motor in response to said fluctuating pressures; and manually operable means independent of said fluid supply means and connected to a portion of said automatic means to be rotated for reversing the direction of rotation of said motor.

12. The combination as set forth in claim 11 together with means adjustable to a plurality of fixed positions for varying the limits of operation of said automatic means.

13. In combination with an internal combustion engine having an oil circulating pump; a hydraulic transmission comprising a driving member driven by said engine; a driven member; a fluid pump operated by the rotation of said driving member; a fluid motor operated by fluid delivered thereto by said fluid pump driving said driven member; a fluid storage reservoir for said fluid pump open to atmosphere and an oil connection from said oil circulating pump to said storage reservoir.

14. A hydraulic transmission comprising a driving member, a driven member, a fluid pump actuated by said driving member, a fluid motor driving said driven member and actuated by operating fluid delivered thereto from said pump, a housing structure for the pump and motor including a cored body provided with a fluid storage reservoir adapted to receive the operating fluid from and to deliver it to said pump and said motor, and means for circulating a cooling liquid through said cored body to cool said fluid incorporated in said reservoir.

15. A fluid operated power transmission comprising a driving member, a driven member, a pump actuated by the difference in rotation of said driving and said driven members, a fluid motor in longitudinally spaced relation with respect to said pump and in driving engagement with said driven member, fluid distributing means interposed between said pump and said motor, and a clutch valve interposed between said pump and said motor adapted to establish an annular circulating fluid bypass between said motor and said pump.

16. In a hydraulic transmission apparatus, a driving member; a casing; a driven shaft journaled in said casing; a pump comprising complemental elements actuated by relative rotation of said member and said shaft; a motor, for driving said shaft, comprising complemental units one of which is secured to said shaft to react thereagainst in the opposite direction therefrom than said pump; means distributing fluid between said pump and said motor; said shaft having one end extending through said pump, and balancing means carried by said one end for cooperation with said pump to form a chamber in communication with the fluid delivered by said pump; said balancing means being proportioned to cause the thrust reactions of pump and motor longitudinally of the shaft to oppose each other so that the elements thereof float with and on the shaft in close and fluid sealing relationships.

17. In the apparatus defined in claim 16, said apparatus including means automatic in response to developed pump pressures as influenced by torque demands to cause automatic relative adjustment of said complemental motor units to vary the motor capacity and hence the torque multiplication.

18. In the apparatus defined in claim 16, one of said complemental units of the motor being adjustable to a plurality of positions to vary the motor capacity, including a position of zero capacity in which the pump and motor are coupled for direct drive; and resilient means constantly urging said one complemental unit toward said position of direct couple.

19. In combination, a stationary casing; a shaft journaled in said casing; a rotary pump mounted upon said shaft between one end thereof and a portion of said stationary casing; a motor disposed on the other side of said portion and designed to receive fluid from said rotary pump; means mounted upon said one end of the shaft and secured against longitudinal movement with respect thereto, and cooperating with said pump to form an expansible fluid chamber; and means for admitting pressure fluid into said chamber to force said pump toward said portion of said casing.

20. In combination with a vehicle, a power plant for propelling the vehicle, said plant comprising a combustion engine having a cooling system, and a hydraulic transmission apparatus driven by said engine, said transmission apparatus comprising a casing; a pump and motor mounted in said casing with means to circulate fluid between them; and conduits connected between said system and said casing to circulate the cooling medium for said combustion engine through said apparatus to cool said transmission fluid.

21. In a hydraulic transmission sub-combination, a casing; a shaft journaled in said casing; and a motor for driving said shaft comprising a swash plate supported thereby, a cylinder block, pistons in the cylinders of said block, socket bearings carried by said pistons and said swash plate, connecting rods having their ends fitted into said sockets, longitudinal passages extending through said rods, and check valves on the pressure sides of said piston, said valves opening toward, and establishing communication with, said passages.

22. In combination, a rotative driving member, and a hydraulic transmission axially aligned therewith and actuated thereby; said transmission comprising a rotary fluid pump, a fluid motor, and means for distributing fluid between said pump and said motor to drive the latter from the former; said rotary pump comprising a pair of axially adjustable side walls, and pumping mechanism including a rotatable element disposed between said side walls; and inter-engaging means carried on said rotatable element and said driving member to drive said element through said member, said means being designed to permit relative axial movement between said element and said member.

In testimony whereof I affix my signature.

ALDEN G. RAYBURN.